United States Patent [19]
Dugan et al.

[11] Patent Number: 5,083,211
[45] Date of Patent: Jan. 21, 1992

[54] METHOD AND APPARATUS FOR OPTIMIZING VIDEO RECORDING AND REPRODUCTION

[75] Inventors: Michael D. Dugan, Albion; Jon L. Hoeft, Rochester, both of N.Y.

[73] Assignee: Eastman Kodak Company, Rochester, N.Y.

[21] Appl. No.: 370,950

[22] Filed: Jun. 23, 1989

[51] Int. Cl.$^5$ ............ G11B 3/90; H04N 5/78; H04N 9/79
[52] U.S. Cl. ............ 358/310; 358/315; 358/316; 358/327; 360/10.1; 369/58
[58] Field of Search ............ 358/315, 316, 327, 310, 358/330, 31; 360/10, 30; 369/58

[56] References Cited

U.S. PATENT DOCUMENTS

| | | |
|---|---|---|
| 4,258,397 | 3/1981 | Kitamura et al. |
| 4,297,730 | 10/1981 | Kadowaki et al. |
| 4,422,108 | 12/1983 | Sampei et al. |
| 4,422,109 | 12/1983 | Sampei et al. |
| 4,528,602 | 7/1985 | Crick et al. |
| 4,590,510 | 5/1986 | Jensen et al. ............ 358/327 |
| 4,682,245 | 7/1987 | Shibata et al. ............ 358/327 |
| 4,807,056 | 2/1989 | Sasaki et al. ............ 358/327 |
| 4,878,128 | 10/1989 | Yasumura et al. ............ 358/315 |
| 4,896,219 | 1/1990 | Yasumura et al. ............ 358/327 |

*Primary Examiner*—Roy N. Envall, Jr.
*Assistant Examiner*—Nabil Hindi
*Attorney, Agent, or Firm*—Parkhurst, Wendel & Rossi

[57] ABSTRACT

A method and apparatus for automatically compensating for variations in recording medium, performance of the recording/playback head and the efficiency of the head/medium interface during video recording is disclosed. Automatic compensation in the recording of the video signal is accomplished by first recording a test signal on the recording medium, reproducing the recorded test signal from the recording medium, measuring one or more characteristics of the test signal, modifying recording parameters based on the measured characteristics, erasing the recorded test signal, and recording a video image signal using the modified recording parameters.

13 Claims, 2 Drawing Sheets

METHOD AND APPARATUS FOR OPTIMIZING VIDEO RECORDING AND REPRODUCTION

BACKGROUND OF THE INVENTION

The present invention relates in general to recording and reproducing video signals. In particular, the present invention provides a method and apparatus for optimizing the recording and reproduction process by automatically adjusting various parameters of the recording process to compensate for variations in the quality of the recording medium, degradation of the record/playback head and the efficiency of the head/medium interface.

Technical advancements in the past several years in the field of video recording have brought the concept of providing a practical and commercially viable still video system (SVS) to reality. SVS camera and player/recording units have recently been demonstrated that permit the user to record up to fifty half-frame or twenty-five full frame still video images on a single magnetic recording disk. A standard still video format (SVF) has been developed wherein the twenty-five full frame still images are recorded on fifty recording tracks of an SVF recording disk.

Problems have been experienced in still video systems, however, with luminance (luma) and chrominance (chroma) signal degradation due to track to track variations of the recording medium. For example, many recording disks are known to have higher noise levels at track fifty as compared to track one. As a result, the luma signal/noise ratio (SNR) will decrease thereby producing a picture of degraded quality upon reproduction. The magnetic material on the disk may also be distributed in a nonuniform manner, causing variations in playback signal levels from track to track.

One possible way to eliminate the problem of reduced luma SNR described above would be to boost the recording current at the inner tracks of the disk. In such a case, however, it is necessary to determine the exact amount of current increase in order to avoid creating other problems. For example, the disk could be divided into two zones, one zone containing tracks 1–25 and the second zone containing tracks 26–50, to which two different recording levels would be applied. The higher recording current at track 26, however, may create an increase in intermodulation that was not present at track 25. Thus, it is necessary to ascertain the quality of each individual track of the recording disk and to adjust recording parameters accordingly in order to compensate for track to track variations, rather than relying on predetermined changes of recording parameters based on arbitrary groupings of recording tracks.

Other factors may also effect the reproduction of the video image in addition to the variations in disk quality, such as degradation of performance of the recording/playback head and the efficiency of the head/medium interface. It would therefore be desirable to automatically compensate for these additional factors while correcting for variations in disk quality.

SUMMARY OF THE INVENTION

The purpose of the present invention is to provide a method and apparatus for automatically compensating for variations in recording medium, performance of the recording/playback head and the efficiency of the head/medium interface during video recording.

The present invention is based on the recognition that in the process of recording and reproducing a video signal, certain characteristics can be monitored that give an indication of the quality of the recording medium, the performance of the recording/playback head, and the efficiency of the head/medium interface. These characteristics include, but are not limited to, high frequency response, luma playback amplitude, playback signal-to-noise ratio (SNR), intermodulation between the luma carrier and the chroma carrier, chroma playback amplitude, chroma SNR, data playback amplitude, and data carrier SNR.

Automatic compensation in the recording of a video image signal is accomplished by first recording a test signal on the recording medium, reproducing the recorded test signal, measuring one or more of the above-described characteristics, modifying recording parameters based on the measured characteristics, erasing the recorded test signal, and recording the video signal using the modified recording parameters. The process of recording the test signal and correcting the recording parameters based on the measured characteristics can be repeated a number of times to ascertain the effectiveness of the corrections made to the recording parameters and to provide further adjustments before recording the video image signal.

BRIEF DESCRIPTION OF THE DRAWING

With the above as background, reference should now be made to FIGS. 1A and 1B which illustrate a schematic block diagram of a video processing system in accordance with the present invention.

DETAILED DESCRIPTION OF THE PREFERRED EMBODIMENT

Figure 1A:
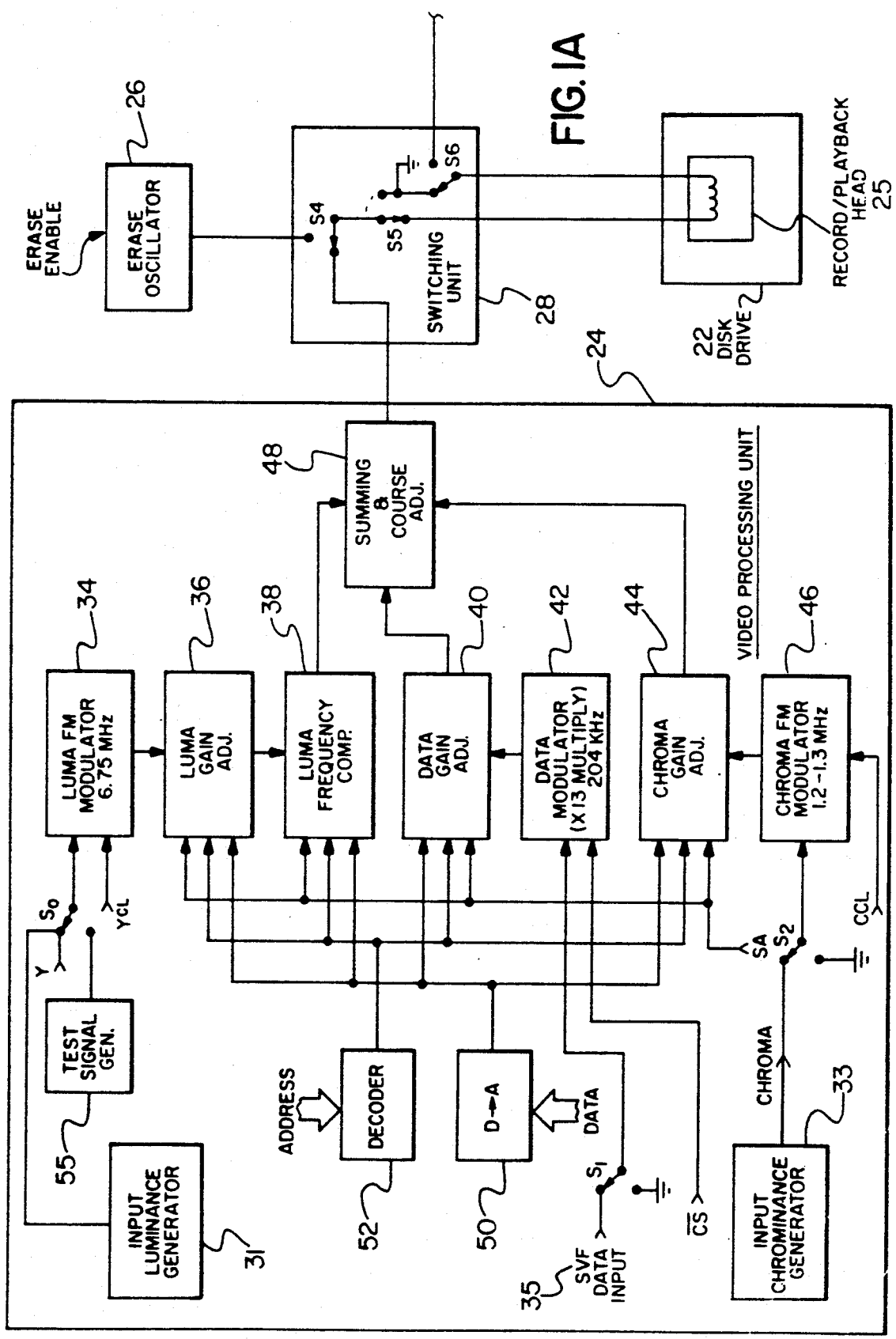
Figure 1B:
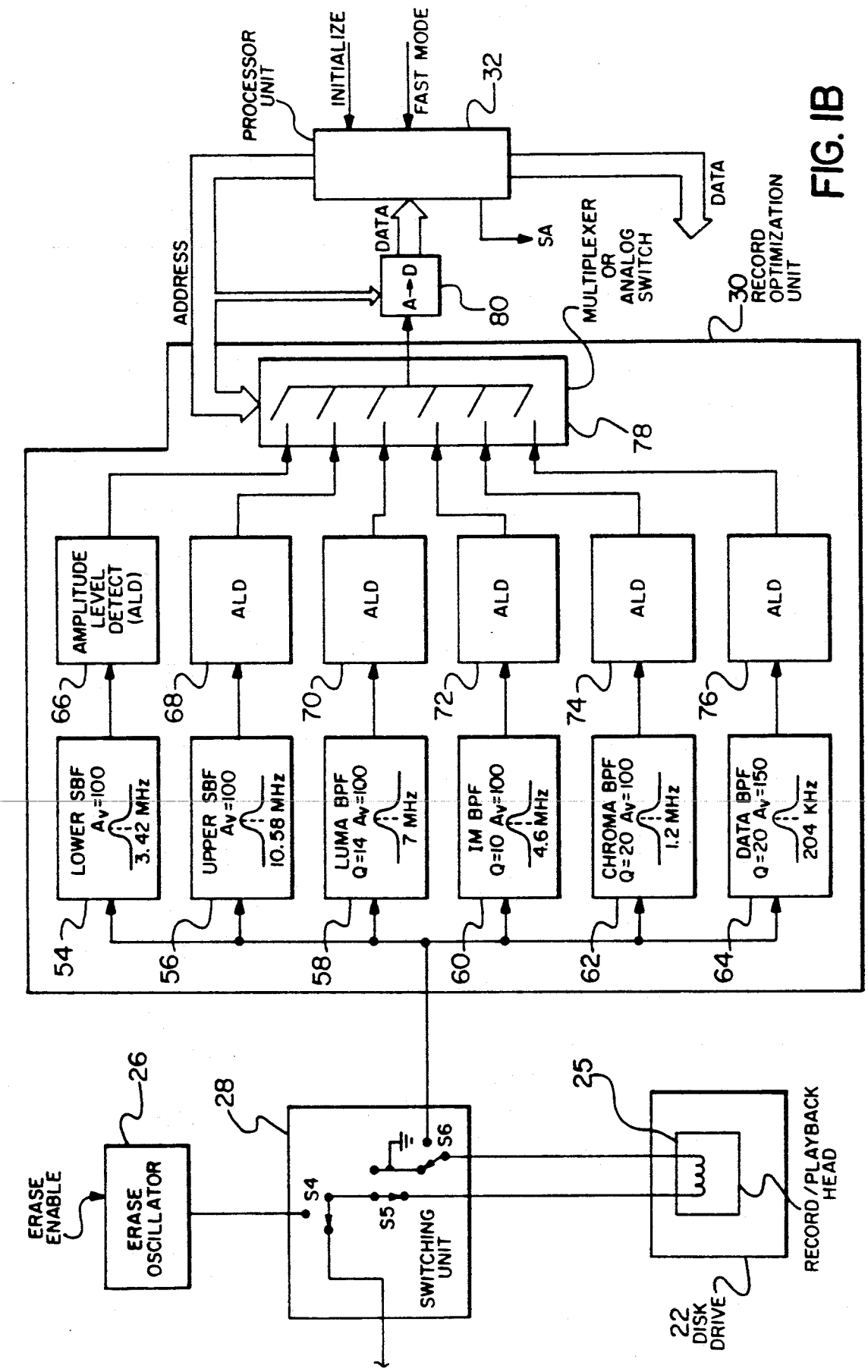

Referring now to FIGS. 1A and 1B, a video processing system according to the invention is shown having a video processing unit 24, an erase oscillator 26, a switching unit 28, a record optimization unit 30, and a process control unit 32.

The video processing unit 24 includes an input luminance signal generator 31 and an input chrominance signal generator 33 that are respectively coupled to a luma modulator 34 and a chroma modulator 46 via switches $S_0$ and $S_2$. An SVF data input 35 is provided, although other data formats are of course possible, which can be selectively coupled to a SVF data modulator 42 via switch $S_1$. The output signals from the luma modulator 34, the chroma modulator 46 and the data modulator 42, are respectively supplied to a luma gain adjustment circuit 36, a chroma gain adjustment circuit 44 and a data gain adjustment circuit 40. The luma gain adjustment circuit 36 is coupled to a luma frequency compensation network 38, the output of which is supplied to a summing and adjustment circuit 48 along with the output signals from the data gain adjustment circuit 40 and the chroma gain adjustment circuit 44.

Each of the gain adjustment circuits 36, 40 and 44 and the luma frequency compensation network 38 are coupled to a digital-to-analog converter 50 and an address decoder 52. The digital-to-analog converter 50 and the address decoder 52 are coupled to the processing unit 32, so that the process control unit 32 may selectively address and apply an adjustment voltage to each of the gain adjustment circuits 36, 40, and 44 and the luma frequency compensation network 38.

The frequency compensation network 38 includes a low pass filter and a high pass filter (not shown). The adjustment voltage from the digital-to-analog converter 50 is provided to an adjustable element (e.g. a varactor diode or voltage dependent resistor) in each filter to adjust the cutoff points of the filters. If more gain is required at the measured frequency, the process control unit 32 addresses the frequency compensation network 38 and supplies an appropriate adjustment voltage via the digital-to-analog converter 50 to the adjustable element of the high pass filter to move its cutoff point higher, thereby allowing the higher frequencies to pass with less attenuation or more gain. The low pass filter is adjustable in a similar manner.

The video processing unit 24 also includes a test signal generator 55, the output of which is selectively supplied via a switch $S_0$ to the luma modulator 34. The test signal generator 55 produces a composite luminance signal having an average picture level of 50 IRE and incorporating a 3.58 MHz modulated sine wave. The operation of the test signal generator 55 and switches $S_0$, $S_1$ and $S_2$ which are controlled by the process control unit 32 will be discussed in greater detail below.

The switching unit 28, that also includes an associated driver and amplifier which are not shown, is configured to selectively supply either the output signal from the video processing unit 24 or the output signal from the erase oscillator 26, via switch $S_4$ and switch $S_5$, to a dual purpose record/playback head 25 of the disk drive 22. The signal reproduced by the record/playback head 25 during a playback mode is supplied to the record optimization unit 30, by connecting switch $S_5$ to ground and switch $S_6$ to the input of the record optimization unit 30.

The record optimization unit 30 has a plurality of band pass filters (BPF) including a lower sideband frequency filter (SBF) 54 and an upper SBF filter 56, a luma BPF 58, a chroma BPF 62, a data BPF 64 and an intermodulation (IM) BPF 60. The peaks of the output signals from the band pass filters 54-64 are detected by corresponding amplitude level detectors (ALD) 66-76. A multiplexer or analog switch 78 is provided so that each of the output signals from the amplitude level detectors 66-76 can be individually selected and supplied to an analog-to-digital converter 80. The output from the analog-to-digital converter 80 is then supplied to the process control unit 32.

The operation of video processing system to optimize the recording process will now be described in greater detail. As previously discussed, optimization is accomplished by recording a test signal to a magnetic disk inserted in the disk drive, reproducing the test signal, analyzing the test signal, and correcting recording parameters based on the analysis of the test signal.

The process control unit 32 enters a test mode of operation upon receipt of an initialization signal. The initialization signal can be generated, for example, by an operator controlled switch or other input device (not shown). In the test mode, the processing unit 32 first sets the switches $S_0$, $S_1$ and $S_2$ of the video processing unit 24 so that the output of the test signal generator 55 is supplied to the luma modulator 34, and the inputs to the data modulator 42 and chroma modulator 46 are disabled by grounding their inputs. The test signal generated by the test signal generator 55 consists of a NTSC composite luminance signal only. The signal has an average picture level of 50 IRE and incorporates a 3.58 MHz sine wave.

The process control unit 32 also commands the switching unit 28 to connect the output of the video processing unit 24 to the record/playback head 25 of the disk drive 22. The test signal is thereby recorded on a selected track of a magnetic disk (or any other type of suitable recording medium) inserted in the disc drive 22.

After recording of the test signal is completed, the process control unit 32 commands the switching unit 28 to connect the record/playback head 25 to the input of the record optimization unit 30. The test signal previously recorded on the magnetic disk is then reproduced and supplied to each of the band pass filters 54-64 and corresponding amplitude detectors 66-76 of the record optimization unit 30 to detect the peak value of the upper and lower sidebands, luma, chroma, intermodulation, and data signal components of the test signal. The process control unit 32 reads each of the detected peak values of the signal components via the multiplexer 78 and analog-to-digital converter 80, analyzes the detected peak values based on certain preselected criteria, and controls the operation of the gain adjustment circuits 36, 40 and 44 and the luma frequency compensation network 38 based on the analysis of the detected peak values to optimize the recording process.

For example, the luma playback amplitude is measured by passing the reproduced test signal through the luma BPF 58 which is centered at 7 mHz and preferably is about $+/-0.5$ mHz wide (Q=14), and detecting the peak value with the amplitude level detector 70. The process control unit 32 compares the peak value of the luma signal to a base noise value, determined by playing back an erased portion of the disk to establish a "no-signal" measurement or "noise floor" for the disk, and increases the gain of the luma gain adjustment circuit 36 if the difference between the peak value and the base noise value is below a predetermined level. The process control unit 32 can also signal a rejection of the disk if the base noise value is above an acceptable level.

Corrections for intermodulation is accomplished in a similar manner. For the test signal, the intermodulation product should be at $7-(2*1.2)$ or about 4.6 mHz. The intermodulation product is a result of the record/playback head 25 itself, and more precisely, is determined from the luma/chroma ratio of the recording. The level of the intermodulation signal is extracted by the intermodulation BPF 60 and amplitude detection circuit 72. The process control unit 32 reads the peak value of the intermodulation signal and determines whether luma/chroma ratio should be changed by adjusting the gain of the luma gain adjustment circuit 36 and the chroma gain adjustment circuit 46.

Other constraints on the absolute signal level of chroma record current and also the chroma signal/noise ratio can be measured and controlled, by examining the recovered chroma carrier playback amplitude with the chroma BPF 62 and the amplitude level detection circuit 74. Again, the process control unit reads the peak value of the chroma signal and adjusts the chroma record current accordingly.

In order to optimize the recording process, one of the most important items to address is how the high frequency components of the record video signal are going to be reproduced. This is the reason why the test signal is modulated at 3.58 mHz which gives rise to FM sidebands at 3.42 and 10.58 mHz. Ideally, the two sidebands should have identical amplitudes and phase angles relative to the 7 mHz carrier. If the amplitudes of phases are not matched properly, proper demodulation will not occur with the result being loss of high frequency resolution in the picture. Because of the very nature of the record/playback head 25, the magnetic material employed on the disk, and their interface, there is and always will be some loss in amplitude and phase matching. The process control unit 32 controls compensation of the high frequency components by analyzing the amplitudes of the two sidebands detected by the amplitude detection circuits 66 and 68. The process control unit 32 then controls the recording band pass characteristic of the luma signal by adjusting the luma frequency compensation network 38.

Finally, the process control unit 32 adjusts the data carrier level by reading the peak value of the data carrier passed through the data BPF and detected by the amplitude level detector 76, and adjusting the gain of the data gain adjustment circuit 42.

After the process control unit 32 makes the appropriate adjustments as set forth above, the optimization process is repeated to determine if additional corrections are required. Once the test signal has be reproduced in a satisfactory manner, the process control unit 32 sends a command to the switching unit 2B to connect the output signal from the erase oscillator 26 to the record/playback head 25 to erase the test signal from the magnetic recording disk. The processing unit 32 then sets the switches $S_0$, $S_1$ and $S_2$ so that recording of the video image captured by the imager 18 can take place.

The optimization process preferably goes through at least two iterations, one for the initial recording of the test signal and a second to measure the effects of the changes made. Total elapsed time for making the corrections, however, is on the order of only about 130 ms. Thus, the video processing system may be readily employed in a still video camera system or video recorder/player in which the time span between images to be recorded will be greater than the 130 ms required for the optimization process for most applications. The video processing system, however, can also include a fast recording mode, wherein the process control unit 32 bypasses the optimization mode in response to an command signal and controls the operation of the video processing unit 24, switching unit 28 and disk drive 22 to directly record images on the magnetic disk.

The present invention has been described with reference to certain preferred embodiments thereof, it will be understood that modifications and variations may be made which will fall within the scope of the claims. For example, characteristics of the components of the reproduced test signal other than the peak amplitude level can be employed to ascertain whether recording parameters should be changed. The present invention is also not limited to the recording still video format images or the use of a magnetic storage medium as referred to in the description of the preferred embodiment above. Finally, a general purpose microprocessor or custom designed integrated circuits may be employed for the process control unit 32.

What is claimed:

1. An apparatus for optimizing recording parameters of a disc drive recording unit, said apparatus comprising:

a. a video processing unit including means for receiving a video image signal, a test signal generator for generating a video test signal, processing circuitry for selectively processing said video input signal and said video test signal, and parameter adjustment means for adjusting various parameters of said video image signal and said video test signal during processing by said processing circuitry;

b. a disc drive recording unit including recording means for receiving said video image signal and said video test signal from said processing circuitry and selectively recording said signals on a selected track of a recording disc, and reproduction means for reproducing said signals from said selected track; and c. optimizing means, coupled to said reproduction means and said parameter adjustment means, for analyzing said video test signal reproduced forms aid selected track by said reproduction means and controlling said parameter adjustment means based on the analysis of said video test signal.

2. An apparatus as claimed in claim 1, wherein said optimizing means comprises means for analyzing at least one sideband of said video test signal reproduced from said selected track and said parameter adjustment means comprises means for varying a frequency response parameter of said video test signal and said video image signal during processing by said processing circuitry.

3. An apparatus as claimed in claim 1, wherein said optimizing means comprises means for analyzing a luminance level parameter of said video test signal reproduced from said selected track and said parameter adjustment means comprises means for varying a luminance level parameter of said video test signal and said video image signal during processing by said video processing means.

4. An apparatus as claimed in claim 1, wherein said optimizing means comprises means for analyzing a chrominance level parameter of said video test signal reproduced from said selected track and said parameter adjustment means comprises means for varying a chrominance level parameter of said video test signal and said video image signal during processing by said processing circuitry.

5. An apparatus as claimed in claim 1, wherein said optimizing means comprises means for analyzing an intermodulation parameter of said video test signal reproduced from said selected track and said parameter adjustment means comprises means for varying a chrominance level parameter and a luminance level parameter of said video test signal and said video image signal during processing by said processing circuitry.

6. An apparatus as claimed in claim 1, wherein said optimizing means comprises means for analyzing a still video data parameter of said video test signal reproduced from said selected track and said parameter adjustment means comprises means for varying a still video data parameter of said video test signal and said video image signal during processing by said processing circuitry.

7. An apparatus as claimed in claim 1, further comprising means for erasing said test signal from said selected track prior to the recording of said video image signal on said recorded track.

8. An apparatus as claimed in claim 1, further comprising control means for controlling the operation of said video processing and said disc drive recording unit to first, record said video test signal on said selected track, second, response said video test signal from said selected track, third, adjust selected parameters via said parameter adjustment means in response to signals received from said optimizing means, and fourth, record said video image signal on said selected track.

9. A method of adjusting the luminance frequency response of a video signal comprising the steps of:
 a. generating a test signal composed of a luminance carrier;
 b. modulating said luminance carrier with a video frequency sine wave signal;
 c. recording said modulated luminance carrier on a recording medium;
 d. reproducing said test signal from said recording medium;
 e. separating at least one sideband from said reproduced test signal, and
 f. compensating the frequency response of the test signal in response to the peak value of said separated sideband of said reproduced test signal.

10. A method of adjusting luminance and chrominance levels in a video signal comprising the steps of:
 a. generating a composite video test signal including a luminance carrier and a chrominance carrier;
 b. recording said composite video test signal on a recording medium;
 c. reproducing said composite video test signal from said recording medium;
 d. filtering said luminance carrier from said reproduced composite video test signal, and
 e. adjusting the level of said luminance carrier in response to a peak value of said filtered luminance carrier.

11. A method as claimed in claim 10, further comprising the steps of:
 f. filtering said chrominance carrier from said reproduced composite video test signal, and
 g. adjusting the level of said chrominance carrier in response to a peak value of said filtered chrominance carrier.

12. A method as claimed in claim 11, further comprising the steps of:
 h. filtering an intermodulation product from said reproduced composite video test signal, and
 i. adjusting the ratio of said luminance carrier to said chrominance carrier in response to a peak value of said intermodulation product.

13. A method as claimed in claim 11, further comprising the steps of:
 h. filtering a data carrier from said reproduced composite video test signal, and
 i. adjusting a data/chrominance ratio based on said filtered chrominance carrier and said data carrier.

* * * * *

UNITED STATES PATENT AND TRADEMARK OFFICE
CERTIFICATE OF CORRECTION

PATENT NO. : 5,083,211

DATED : January 21, 1992

INVENTOR(S) : Michael D. Dugan and Jon L. Hoeft

It is certified that error appears in the above-identified patent and that said Letters Patent is hereby corrected as shown below:

Column 6, line 12, change "forms" to --from--;

line 13, change "aid" to --said--; and line 64, change "response" to --reproduce--.

Signed and Sealed this

Fourth Day of May, 1993

Attest:

MICHAEL K. KIRK

Attesting Officer

Acting Commissioner of Patents and Trademarks